March 10, 1970 YOSHITSUGU TSUCHIYA ET AL 3,499,468
CONTROL VALVE FOR USE WITH HYDRAULIC STEP MOTOR
Filed April 25, 1968 14 Sheets-Sheet 1
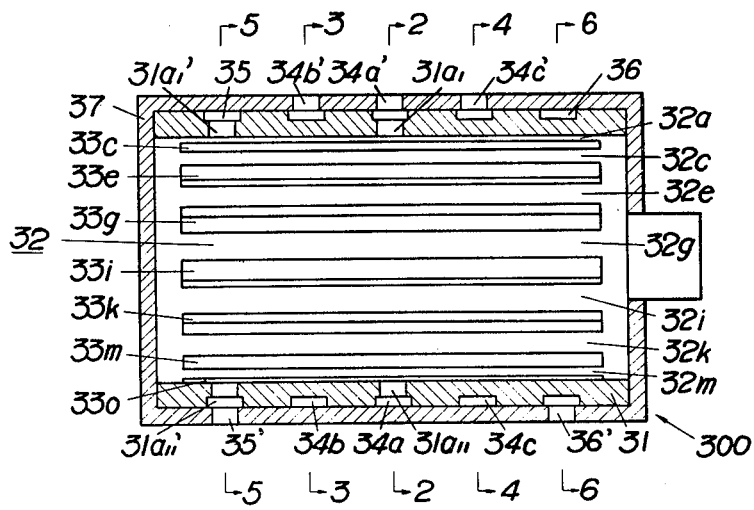
Fig./
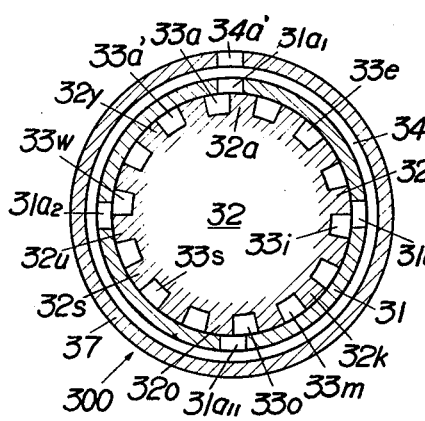
Fig.2
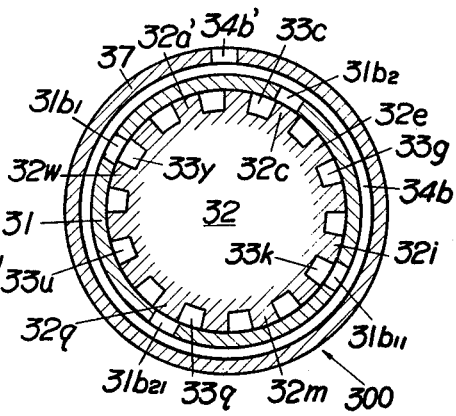
Fig.3
INVENTORS
Yoshitsugu Tsuchiya and
Kazuyoshi Uyama
BY
Their Attorney Width of Land = 1.5 Steps.
Width of Cavity = 1.5 Steps.
Width of Port = 1.5 Steps.
Phase Difference = 1.5 Steps.

Width of Land = 1.5 Steps.
Width of Cavity = 1.5 Steps.
Width of Port = 1.5 Steps.
Phase Difference = 1.5 Steps.

INVENTORS
Yoshitsugu Tsuchiya and
Kazuyoshi Uyama
BY
Their Attorney

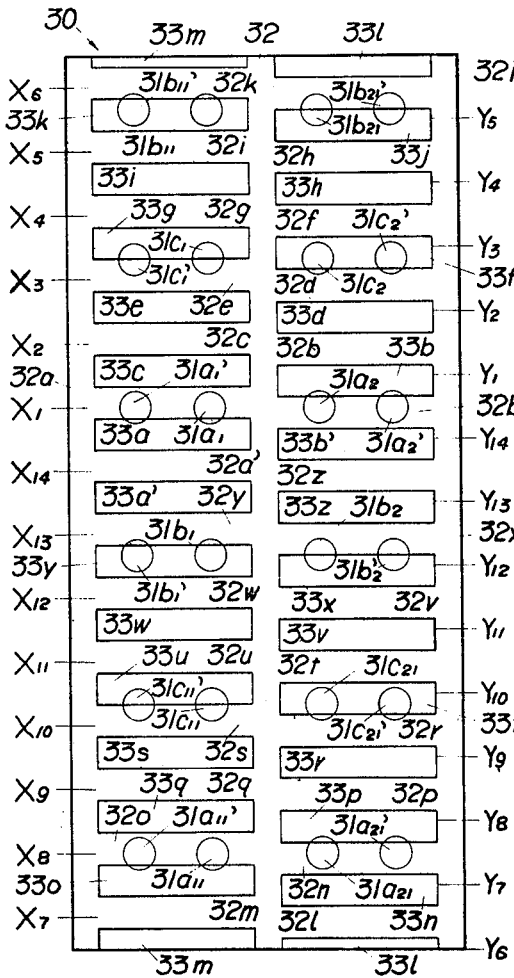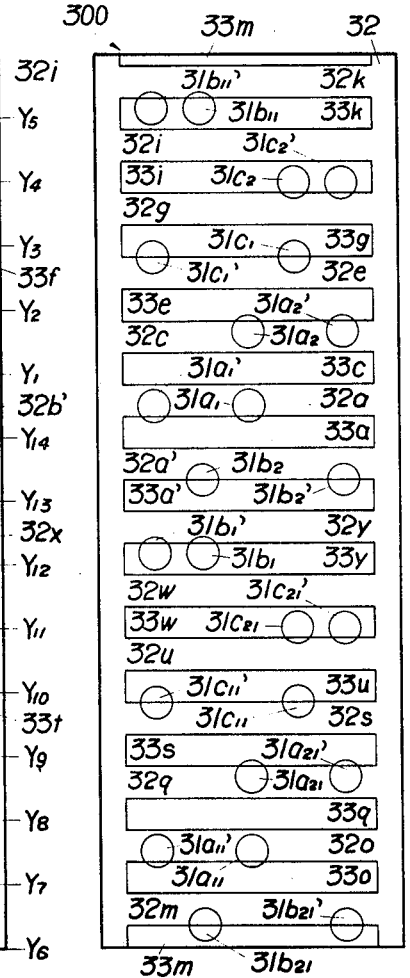
Fig. 21
Width of Land = 1.5 Steps.
Width of Cavity = 1.5 Steps.
Width of Port = 1.5 Steps.
Phase Difference = 0.5 Step.
Fig. 22
Width of Land = 1.5 Steps.
Width of Cavity = 1.5 Steps.
Width of Port = 1.5 Steps.
Phase Difference = 0.5 Step.

Width of Land = 1.5 Steps. Width of Cavity = 1.5 Steps.
Width of Port = 1.5 Steps.

Width of Land = 1.5 Steps. Width of Cavity = 1.5 Steps.
Width of Port = 1.25 Steps.

Width of Land = 1.5 Steps. Width of Cavity = 1.5 Steps.
Width of Port = 1.0 Step.

Width of Land = 2.0 Steps. Width of Cavity = 1.0 Step.
Width of Port = 1.0 Step.

Width of Land = $\frac{23}{12}$ Steps. Width of Cavity = $\frac{13}{12}$ Steps.
Width of Port = $\frac{10}{12}$ Step.

INVENTORS
Yoshitsugu Tsuchiya and
Kazuyoshi Uyama
BY
Their Attorney

Width of Land = $11/6$ Steps. Width of Cavity = $7/6$ Steps.
Width of Port = $4/6$ Step.

Width of Land = $9/4$ Steps. Width of Cavity = $3/4$ Step.
Width of Port = $3/4$ Step.

Width of Land = $17/8$ Steps. Width of Cavity = $7/8$ Step.
Width of Port = $5/8$ Step.

Width of Land = 2.0 Steps. Width of Cavity = 1.0 Step.
Width of Port = 0.5 Step.

INVENTORS
Yoshitsugu Tsuchiya and
Kazuyoshi Uyama
BY
Their Attorney

United States Patent Office 3,499,468
Patented Mar. 10, 1970

3,499,468
CONTROL VALVE FOR USE WITH HYDRAULIC STEP MOTOR
Yoshitsugu Tsuchiya, c/o Mr. Hasegawa, 9–22 1-chome, Kishi-machi, Urawa-shi, Saitama-ken, Japan, and Kazuyoshi Uyama, 25–4, 3-chome, Nishirokugo, Ota-ku, Tokyo-to, Japan
Filed Apr. 25, 1968, Ser. No. 724,157
Claims priority, application Japan, Apr. 28, 1967, 42/26,876
Int. Cl. F17d *3/00*
U.S. Cl. 137—625.19                                9 Claims

ABSTRACT OF THE DISCLOSURE

A control valve for use with a hydraulic step motor in which in order to control the direction and angle of rotation per step of a spool rotatably fitted into a sleeve and coupled mechanically to an output shaft of a rotary type hydraulic driving device, the spool is provided with a group of cavities equidistantly spaced apart from each other and arranged and disposed circumferentially of said sleeve; the sleeve is provided with a suitable number of groups (of sets) of ports each consisting of these ports each of which has different functional characteristics so that the positions of said ports relative to said cavities are always reversed relative to each other, said ports being arranged and disposed in such a manner that the ports which belong to the different phases are not opened to one common cavity and the ports of each of said groups (sets) of ports which belong to the same group are positioned along the same circumference; outer ports for said first mentioned ports are positioned in said sleeve in axial alignment with said first mentioned ports and the outer ports which have the same functional characteristics are positoned along the same circumference; and said outer ports are communicated with supply inlets of said driving device and a hydraulic pressure source through throttles or restrictions while the port groups are opened to the outside, phase by phase, sequentially, whereby the difference of the opening products relative to the cavity group of the ports of each phase having different functional characteristics are utilized to rotate the driving device through a predetermined angle and the selection of the sequence of opening said port groups in each phase controls the direction of rotation of said driving device.

CROSS-REFERENCE TO RELATED APPLICATIONS

The present invention relates to an improvement of the invention disclosed in our application Ser. No. 654,-475, dated July 19, 1967.

BACKGROUND OF THE INVENTION

The invention relates to a control valve suited for being assembled with a rotary type hydraulic driving device so as to construct a hydraulic step motor whose direction of rotation and angle of rotation can be controlled by the sequence of the input signals and the number of input signals applied respectively, and is an improvement of a control valve disclosed in our co-pending application, Ser. No. 654,475.

The original invention relates to a control valve of the type described above, characterized in that a spool which is rotatably fitted into a sleeve is provided with two cavity groups each consisting of the same number of equidistantly spaced apart cavities, said two cavity groups being arranged and disposed in two columns with a suitable phase difference therebetween, said cavity groups being communicated with outer ports; said sleeve is provided with two port sets each consisting of three ports for communication with one of said cavity groups independent of the other port set, said ports being so arranged and disposed that when the ports one from each of said port sets have the same opening area relative to the cavities with the direction of the opening of one of said two ports being opposite to the direction in which the other of said ports is opened, the remaining two ports of each of said port sets are spaced apart from an arbitrary stabilized point by a distance equal to ⅓ or ⅔ of (width of cavity+width of land) in the clockwise and counterclockwise directions from said stabilized point respectively, thereby forming two different phases; said outer ports are communicated with both of supply inlets of said rotary type hydraulic driving device and with a hydraulic pressure source through throttles or restrictions; the output shaft of said driving device is coupled mechanically to said spool; and the ports of said port sets which belong to the same phase are communicated with each other so as to be opened to the outside sequentially, whereby the direction of an angle of rotation of said driving device can be controlled by the sequential order of opening said ports and the number of openings of said ports respectively, and at the same time, the angle of rotation per step can be reduced without increasing the circumferential length of said spool.

However, in the control valve of the type described above, it is preferable to provide pressure equalizing ports for the ports of the sleeve in opposite thereto and with a phase difference of 180° relative to said ports in order to attain the balanced rotation of the spool. When such pressure equalizing ports are provided, they must be communicated with their corresponding ports in addition to the communications of the ports which belong to respective cavity groups. However, to provide such communications among the ports and the pressure equalizing ports is very difficult.

The communications among the ports belonging to each of the cavity groups must be made in the axial direction of the sleeve while the communication of the port and its corresponding pressure equalizing port must be made in the circumferential direction of said sleeve. Therefore, the crossings or intersections of the communication passages cannot be avoided, so that it is impossible to provide the communication passages in the sleeve whose space is limited.

BRIEF SUMMARY OF THE INVENTION

The present invention has for its object to improve a control valve of the type described and to provide an improved control valve in which two groups of cavities provided in a spool of a control valve disclosed in our application cited above are re-arranged into only one cavity group which can be utilized for rotating the spool in both directions.

In order to attain the above described object of the invention, one group of cavities is provided circumferentially of a spool of a control valve of the present invention. A sleeve of the control valve is provided with a suitable number of first port groups each consisting of three ports each of which in turn belongs to a different phase, a suitable number of second port groups each consisting of three ports each of which has a different functional characteristics and are always positioned relative to a cavity in a position reversed to that of the corresponding port in said first port group, and a suitable number of pressure equalizing ports positioned with a phase difference relative to each of said port groups. The ports are arranged and disposed in such a manner that the ports of the port groups which do not belong to the same phase are spaced apart from each other so as not to be opened to the same cavity at the same time and that when the ports one each from said port groups which belong to the same phase but have different functional characteristics have the opening areas to the cavities, remaining two ports of each of the port groups are positioned so as to be spaced apart from an arbitrary stabilized point by a distance of ⅓ or ⅔ (width of land+width of cavity) in both directions from said stabilized point. The ports of each of said port groups which belong to the same phase are arranged so as to position along the same circumferences in three rows while the outer ports which are arranged and disposed axially of said port groups and the outer ports which have the same functional characteristics are arranged to position along the same circumference in two rows.

When the ports are positioned in the sleeve as described above, the ports which must be communicated with each other are positioned along the same circumferences so that the communication among the ports can be made in a much simpler manner by the annular grooves provided in the outer peripheral surface of the sleeve. Thus, when the spool is coupled mechanically to the output shaft of a rotary type hydraulic driving device and the outer ports of the sleeve are communicated with supply inlets of the driving device and with the hydraulic pressure source through the throttles or restrictions while the ports of the sleeve are sequentially opened to the outside, phase by phase, the difference of the opening areas of the ports in each phase having the different functional characteristics can be utilized to rotate through a predetermined angle the driving device. Furthermore, when the sequential order of opening the ports in each phase is suitably selected, the direction of rotation of the driving device can be also controlled. Thus, it will be clearly understood that the present invention provides a control valve simple in construction and compact in size.

The above and other objects, features and effects of the present invention will be best understood from the description taken in conjunction with the accompanying drawings.

BRIEF EXPLANATION OF THE DRAWINGS

FIG. 1 is a longitudinal sectional view of one embodiment of the present invention;

FIGS. 2 to 6 are sectional views taken along respectively the lines 2—2, 3—3, 4—4, 5—5 and 6—6 of FIG. 1;

FIG. 21 is an explanatory developed view of another embodiment of a control valve disclosed in the previous or pending application;

FIG. 22 is an explanatory, developed view of another embodiment of a control valve of the present invention;

DESCRIPTION OF PREFERRED EMBODIMENTS

In preparation of the detailed description of the present invention, reference is made to our co-pending application Ser. No. 654,475, dated July 19, 1967 in which a novel control valve (referred to as "prior control valve" hereinafter for brevity) is disclosed.

Figure 4:
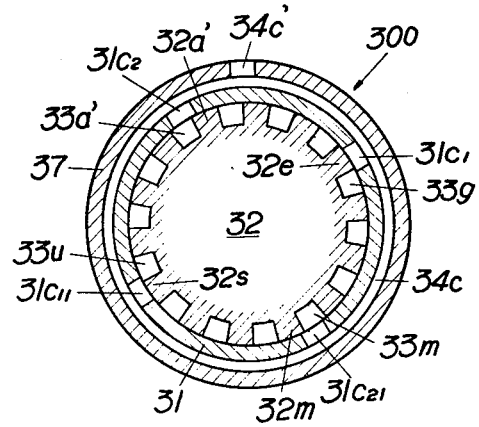
Figure 5:
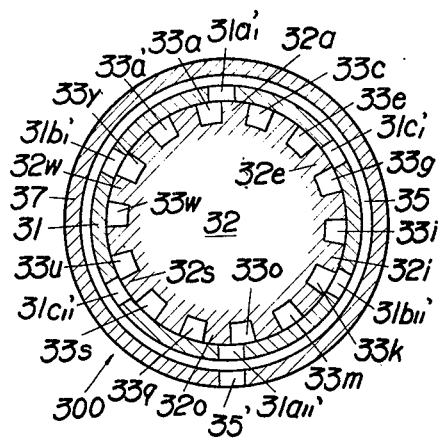
Figure 6:
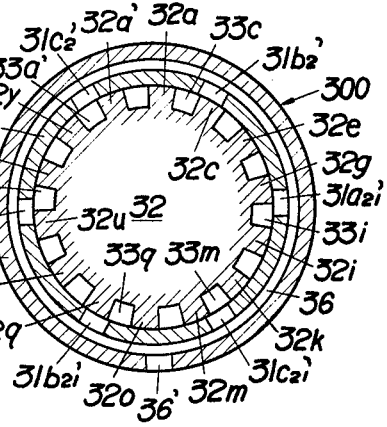
Figure 7:
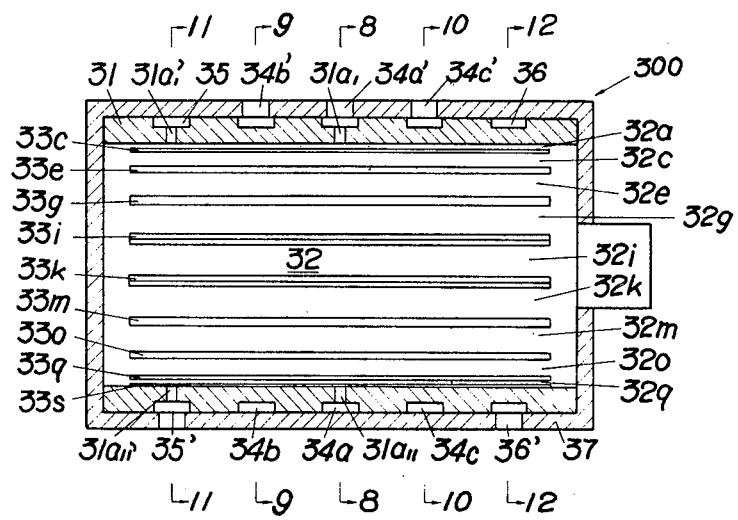
FIG. 7 is a longitudinal sectional view of another embodiment of the present invention.
Figure 8:
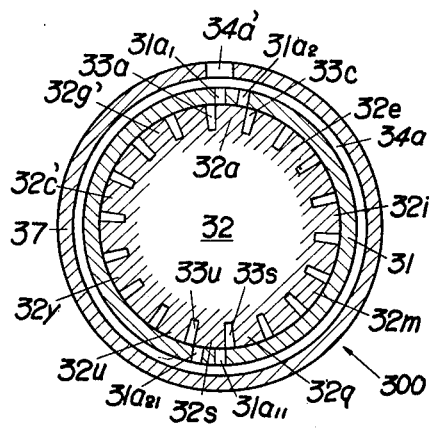
FIGS. 8 to 12 are sectional views taken along the lines 8—8, 9—9, 10—10, 11—11 and 12—12 of FIG. 7 respectively.
Figure 9:
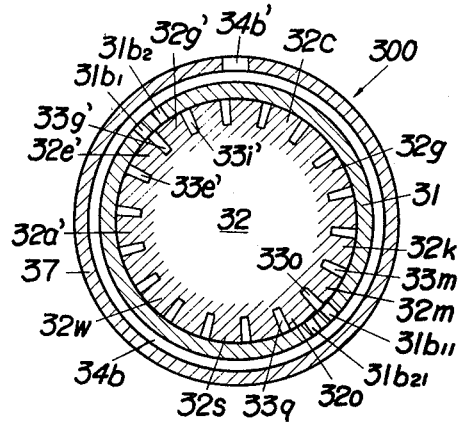
Figure 10:
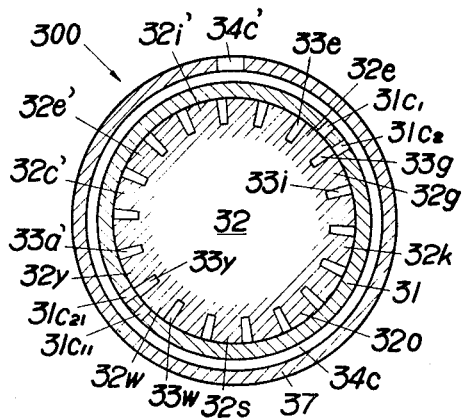
Figure 11:
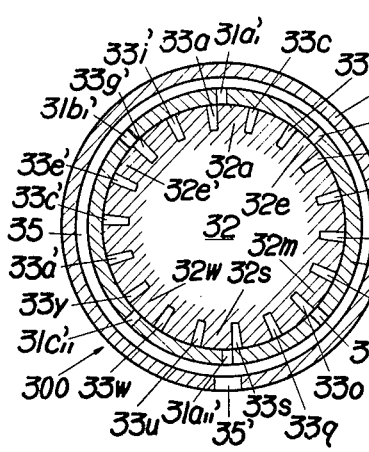
Figure 12:
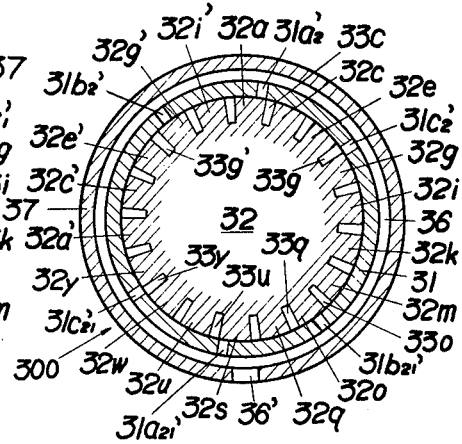
Figure 13:
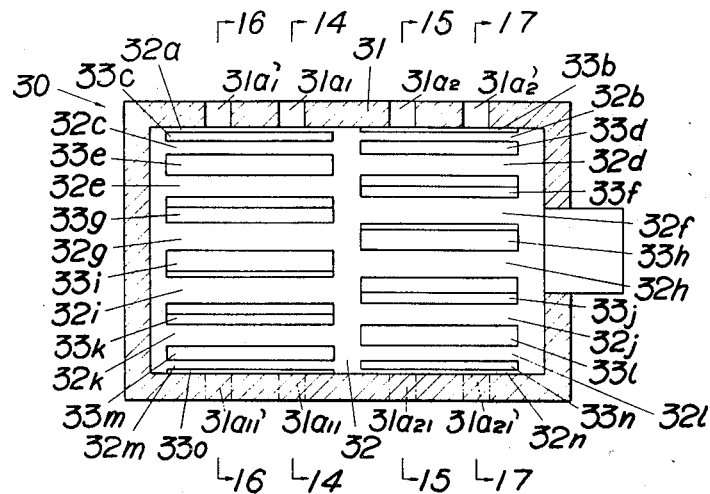
FIG. 13 is a longitudinal sectional view of one embodiment of a control valve disclosed in the previous application.
Figure 14:
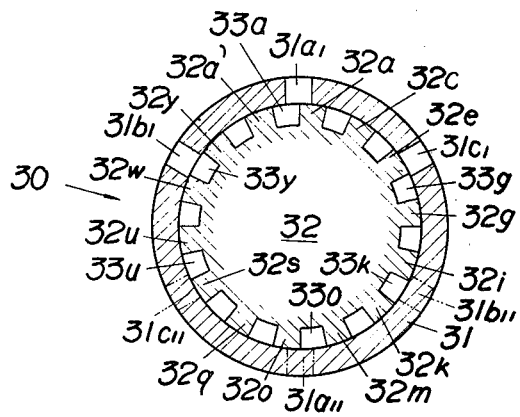
FIGS. 14 to 17 are sectional views taken along the lines of 14—14, 15—15, 16—16 and 17—17 of FIG. 13.
Figure 15:
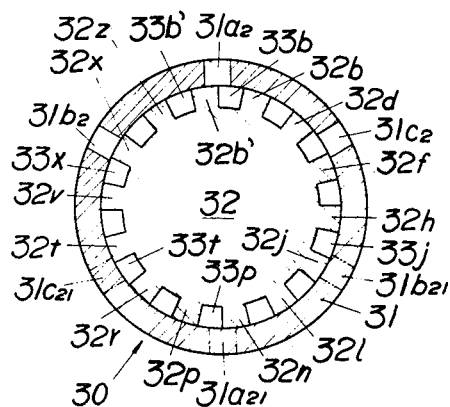
Figure 16:
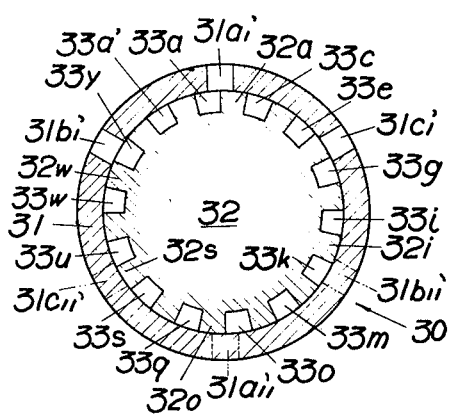
Figure 17:
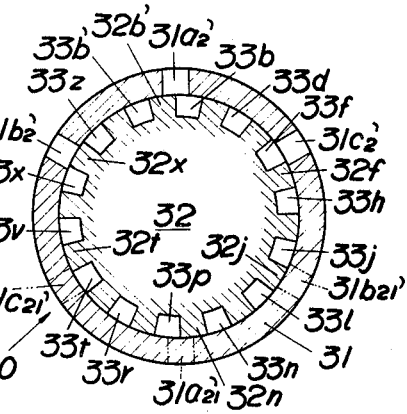

One of the embodiments of the prior control valve of the cited application is shown in FIGS. 13 to 17, and comprises a fixed cylindrical sleeve 31 and a spool 32 rotatably fitted into the sleeve 31. Around the peripheral surface of the spool 32 are arranged and disposed two groups of cavities, one group consisting of equidistantly spaced apart cavities $33a$, $33c$, $33e$, $33g$, $33i$, . . . while the other group, $33b$, $33d$, $33f$, $33h$, $33j$. . . . (In the control valve shown in FIGS. 13 to 17, the control valve is shown as having 14 cavities.) Two cavity groups are arranged in two rows and the phase of each cavity in one group is deviated by the distance corresponding to the width of the cavity relative to that of each cavity in the other group. Each of projected portions interposed between two adjacent cavities has the same width with that of the cavity and is called "land," $32a$, $32c$, $32e$, $32g$, $32i$, . . . and $32b$, $32d$, $32f$, $32h$, $32j$. . . . The sleeve 31 is provided with a set of ports consisting of three ports $31a_1$, $31b_1$ and $31c_1$ disposed opposite to the group of cavities $32a$, $33c$, $33e$, $33g$, $33i$, . . . and a set of outer ports consisting of $31a_1'$, $31b_1'$ and $31c_1'$ disposed in alignment with the ports $31a_1$, $31b_1$ and $31c_1$ respectively in the axial direction of the sleeve 31. The sleeve is further provided with a similar set of ports consisting of three ports $31a_2$, $31b_2$ and $31c_2$ disposed opposite to the group of cavities $33b$, $33d$, $33f$, $33h$, $33j$, . . . and a set of outer ports consisting of $31a_2'$, $31b_2'$ and $31c_2'$ disposed in alignment with the ports $31a_2$, $31b_2$ and $31c_2$ respectively in the axial direction of the sleeve 31. The diameter of each of the ports $31a_1$ to $31c_2$ and the outer ports $31a_1'$ to $31c_2'$ is equal to the width of the cavity in the spool 32. In the control valve as shown in FIGS. 13 to 17, the ports $31a_1$ to $31c_2$ and the outer ports $31a_1'$ to $31c_2'$ are so arranged and disposed that when a pair of ports $31a_1$ and $31a_1'$ are opened by one-half to the right half section of the cavity $33a$ as shown in FIGS. 14 and 16 while another pair of ports $31a_2$ and $31a_2'$ are opened by one-half to the left half section of the cavity $33a$ as shown in FIGS. 15 and 17, the remaining pairs of ports $31b_1$ and $31b_1'$; and $31b_2$ and $31b_2'$ are arranged and disposed so as to be positioned in the counter-clockwise direction ahead of the pairs of ports $31a_1$ and $31a_1'$; and $31a_2$ and $31a_2'$ respectively by:

2×(width of land+width of cavity)+⅓

(Width of land+width of cavity)

and in a similar manner, the remaining pairs of ports $31c_1$ and $31c_1'$; and $31c_2$ and $31c_2'$ are arranged and disposed so as to be positioned in the clockwise direction ahead of the pairs of ports $31a_1$ and $31a_1'$; and $31a_2$ and $31a_2'$ respectively by:

2×(width of land+width of cavity)+⅓

(Width of land+width of cavity)+⅓

Therefore, as shown in FIGS. 14 and 16, the ports $31b_1$ and $31b_1'$ are opened by ⅚ to the left side of the cavity $33y$ while the ports $31c_1$ and $31c_1'$ are opened by ⅙ to the right side of the cavity $33x$ as shown in FIGS. 15 and 17. The ports $31c_2$ and $31c_2'$ are opened by ⅚ to the right side of the cavity $33f$. The position of each of ports provided in sleeve 31 is not limited to the above described arrangement and relation. Generally, the ports are arranged and disposed in such a manner as described hereinafter. First, one port of a set of ports consisting of three ports for one cavity group is located at a position in such a manner that said one port has the same opening area relative to a cavity of said one cavity group with that of another port of another set of ports also consisting of three ports for the other cavity group. In this case, said one port must also be located in such a manner that the opening direction of said one port is opposite to that of said other port. Next, the remaining two ports are located so as to be spaced apart from said one or other ports by a distance equal to [$n \times$ (width of land+width of cavity) +⅓ or ⅔ (width of land+width of cavity)] in both directions circumferentially from said one or other port, where $n$ is an integer.

Figure 18:
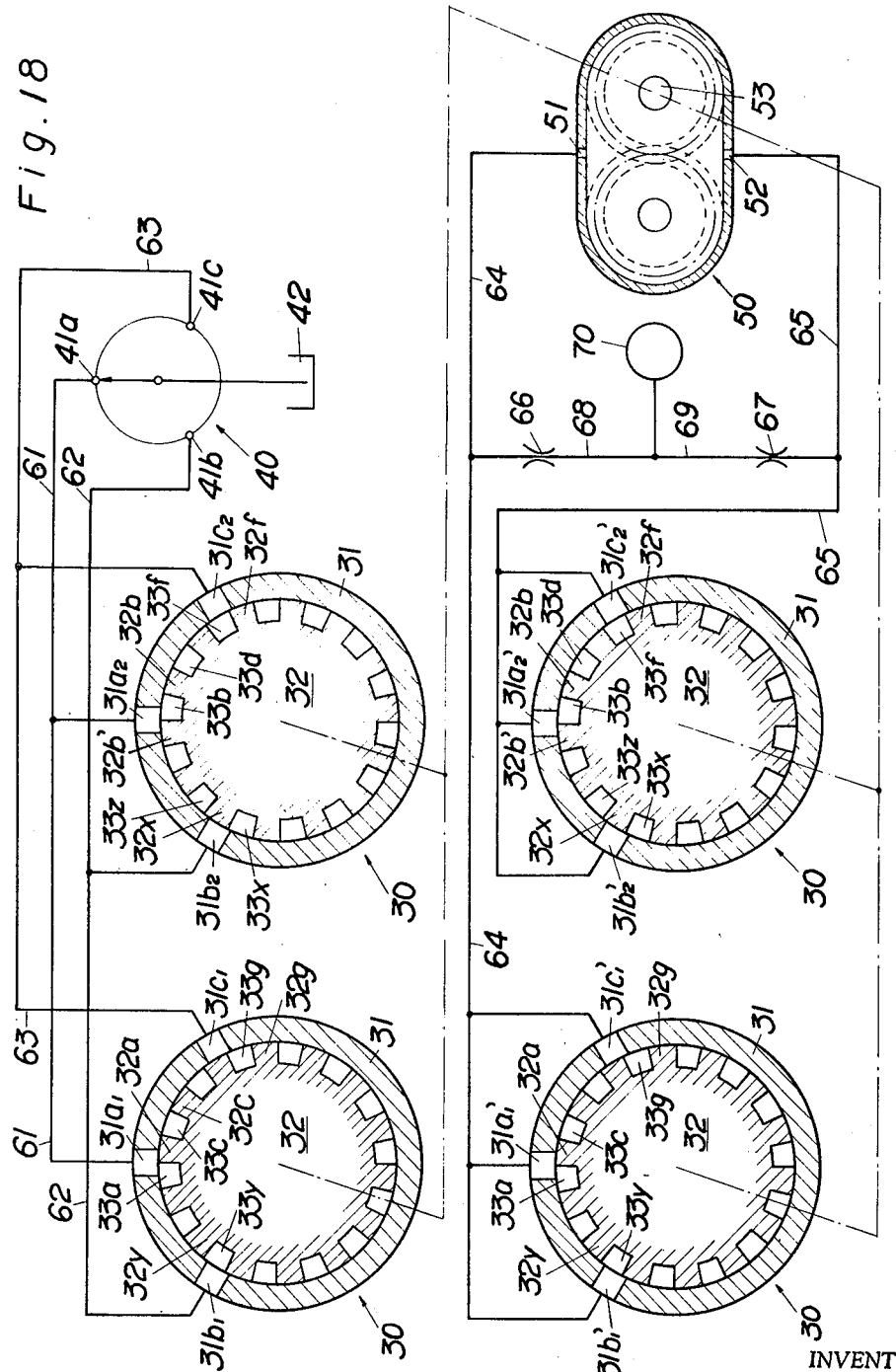
FIG. 18 is a circuit of a hydraulic step motor constructed with the control valve shown in FIGS. 13 to 17 in combination with a rotary type hydraulic driving device.

FIG. 18 shows one example of a hydraulic step motor incorporating the control valves 30 of the type described above, a selector valve 40 for applying an input signal to the control valves 30 and a rotary type hydraulic driving device 50 mechanically coupled with the control valves 30. The ports $31a_1$ and $31a_2$ provided in the sleeve 31 of the control valve 30 communicate with a port $41a$ of the selector valve 40 through a piping 61; the ports $31b_1$ and $31b_2$, with a port $41b$ of the selector valve 40 through a piping 62; and the ports $31c_1$ and $31c_2$, with a port $41c$ of the selector valve 40 through a piping 63. The outer ports $31a_1'$, $31b_1'$ and $31c_1'$; and $31a_2'$, $31b_2'$ and $31c_2'$ are communicated to supply inlets 51 and 52 of the driving device 50 through pipings 64 and 65 respectively. The pipings 64 and 65 communicate with a hydraulic pressure source 70 through pipings 68 and 69 having throttles or restrictions 66 and 67 respectively. The output shaft 53 of the driving device 50 and the spool 32 of the control valve 30 are coupled to each other directly or through a gear train.

The selector valve 40 and the rotary type hydraulic driving device 50 may be of any conventional type available in the market. The control valve 30 may be assembled unitary with the rotary type hydraulic driving device 50.

In FIG. 18, it is shown that the selector valve 40 selects the port $41a$ so that the ports $31a_1$ and $31a_2$ of the control valve 30 are opened to a tank 42 through the piping 61. The ports $31a_1$ and $31a_2$ and the outer ports $31a_1'$ and $31a_2'$ of the control valve 30 are closed by one half by the lands $32a$ and $32b'$ of the spool 32. The port $31a_1$ and the outer port $31a_1'$ communicate with each other through the cavity $33a$ while the port $31a_2$ and the outer port $31a_2'$ communicate with each other through the cavity $33b$. Therefore, the working liquid flows from the pressure source 70 to the tank 42 through a flow passage of the piping 68—the throttle or restriction 66—the piping 64—the outer port $31a_1'$—the cavity $33a$—the port $31a_1$—the piping 61 and the port $41a$; and through another flow passage of the piping 69—the throttle or restriction 67—the piping 65—the outer port $31a_2'$—the cavity $33b$—the port $31a_2$—the piping 61 and the port $41a$ respectively in the order named.

In FIG. 18, the throttle or restricted value of the variable throttling or restricting portion dependent upon the relative positions of the ports $31a_1$ and $31a_1'$ relative to the land $32a$ and the throttle or restricted value of the variable throttling or restricting portion dependent upon the relative positions of the ports $31a_2$ and $31a_2'$ relative to the land $32b$ are maintained equal so that the resistances in both of the flow passages are equal. Therefore, no pressure differences across the supply inlets 51 and 52 of the driving device 50 which communicate with the pipings 64 and 65 respectively is produced so that the driving device 50 is not permitted to rotate in either direction and is held stationary. Therefore, the spool 32 of the control valve 30 is also held stationary. Thus, the step motor is held stationary in the state as shown in FIG. 18.

Now when the selector valve 40 is operated in the counterclockwise direction from the position shown in FIG. 18 so that the port $41a$ is switched over to the port $41b$, the communication of the ports $31a_1$ and $31a_2$ of the control valve with the tank 42 is interrupted while the ports $31b_1$ and $31b_2$ communicate with the tank 42 through the piping 62 and the port $41b$ of the selector valve 40. When the working medium is air, the tank 42 may be eliminated as the air can be discharged into the surrounding atmosphere through the selector valve 40. Then, the supply inlets 51 and 52 of the driving device 50 communicate with the tank 42 through the flow passages consisting of the piping 64—the outer port $31b_1'$—the cavity $33y$—the port $31b_1$—the piping 62 and the port $41b$ of the selector valve 40; and the piping 65—the outer port $31b_2'$—the cavity $33x$—the port $31b_2$—the piping 62—and the port $41b$ of the selector valve 40 respectively. Therefore, the pressure on the side of the piping 64 drops below the pressure on the side of the piping 65 according to the difference of the opening areas of the ports $31b_1$ and $31b_1'$ to the cavity $33y$ and of the ports $31b_2$ and $31b_2'$ to the cavity $33x$, so that the output shaft 53 of the driving device 50 is caused to rotate in the counterclockwise direction together with the spool 32 of the control valve 30.

When the spool 32 rotates in the counterclockwise direction the distance equal to [⅓ × (width of land+width of cavity)], the closed degree of the ports $31b_1$ and $31b_1'$ which are closed by the land $32y$ and the closed degree of the port $31b_2$ and $31b_2'$ which are closed by the land $32x$, that is the opening degrees of the ports $31b_1$ and $31b_1'$ to the cavity $33y$ and the ports $31b_2$ and $31b_2'$ to the cavity $33z$ become one-half of the fully closed or opened area of the port, and are equal with each other. Therefore, the pressure difference in the pipings 64 and 65 is eliminated so that the driving device 50 is stopped together with the spool 32, thereby stopping the step motor.

When the spool 32 is rotated in the counterclockwise direction by the distance equal to the [⅓ × (width of land+width of cavity)] and then stopped, the ports $31c_1$ and $31c_2'$ are opened by ⅚ to the cavity $33g$ while the port $31c_2$ and $31c_2'$, by ⅙ to the cavity $33f$.

Therefore, when the selector valve is further actuated so as to rotate in the counterclockwise direction to switch the port $41b$ to the port $41c$, the supply inlets 51 and 52 of the driving device 50 communicate with the tank 42 through the flow passages of the piping 64—the outer port $31c_1'$—the cavity $33g$—the port $31c_1$—the piping 63—and the port $41c$; and of the piping 65—the outer port $31c_2'$—the cavity $33f$—the port $31c_2$—the piping 63—and the port $41c$ respectively.

Therefore, the pressure in the piping 64 drops below the pressure in the piping 65 according to the difference in the opening areas of the ports $31c_1$ and $31c_1'$ to the cavity $33g$ and of the ports $31c_2$ and $31c_2'$ to the cavity $33f$ so that the output shaft 53 of the driving device 50 is caused to rotate in the counterclockwise direction together with the spool 32 of the control valve 30. When the spool 32 rotates the distance equal to

[⅓ × (width of land+width of cavity)]

the closed or opening degrees of the ports $31a_1$ and $31a_1'$ to the cavity $33c$ and of the ports of $31a_2$ and $31a_2'$ to the cavity $33b$ become ⅚ and ⅙ respectively.

When the selector valve is further actuated so as to rotate in the counterclockwise direction, thereby switching the port $41c$ to the port $41a$, the inlets 51 and 52 of the driving device 50 communicate with the tank 42 through the passages of the piping 64—the outer port $31a_1'$—the cavity $33c$—the port $31a_1$—the piping 61—and the port 41a and the piping 65—the outer port 31a₂'—the cavity 33b—the port 31a₂—the piping 61—and the port 41a respectively. Thus, because of the difference in the opening areas of the ports 31a₁ and 31a₁' to the cavity 33c and of the ports 31a₂ and 31a₂' to the cavity 33b, the pressure difference across the inlets 51 and 52 is produced so that the output shaft 53 of the driving device 50 is caused to rotate in the counterclockwise direction together with the spool 32 of the control valve 30. Thereafter, when the spool 32 of the control valve 30 rotates in the counterclockwise direction by the distance equal to [⅓ (width of land+width of cavity)], the closed degrees of the ports 31a₁ and 31a₁' by the land 32c; and of the ports 31a₂ and 31a₂' by the land 32b become ½ and the hydraulic step motor is stopped in this state.

In this state where the land 32c closes the ports 31a₁ and 31a₁' by one half while the land 32b, the ports 31a₂ and 31a₂' by one half, this state is corresponding to the state shown in FIG. 18 when the reference numerals and characters of the lands and cavities are disregarded. Therefore, when the selector valve 40 is further actuated in the counterclockwise direction so as to switch over the ports 41a to 41c sequentially in the order of 41a, 41b, 41c, 41a, 41b, ... the output shaft 53 of the driving device 50 is caused to rotate continuously together with the spool 32 of the control valve as described hereinbefore.

So far the selector valve 40 has been described as being actuated in the counterclockwise direction so as to switch over the ports from 41a to 41b, from 41b to 41c, from 41c to 41a and so on. In order to communicate the ports sequentially with the tank 42, the selector valve 40 may be actuated in the clockwise direction so as to switch over the ports from 41a to 41c, from 41c to 41b, from 41b to 41a and so on. In this case, the directions of rotation of the output shaft 53 and of the spool 32 are opposite with respect to each other, but other operations are same as in the case of the counterclockwise rotation of the selector valve.

Now it is to be understood that the operation of actuating the selector valve 40 so as to switch over a port to the next port, for example, from 41a to 41b, is referred to as "giving one input signal to a step motor" and that the rotational movement of the spool 32 of the control valve 30 from one stationary position to another upon application of one input signal to the step motor is referred to as "one step." As described above, when three inputs are applied to the step motor by switching over the ports of the selector valve 40 three times, for example from the ports 41a to 41b, from 41b to 41c and from 41c to 41a, the spool 32 of the control valve 30 is caused to rotate three steps and stops in the same state as shown in FIG. 18 when the reference numerals and characters ars disregarded.

That is, the spool 32 of the control valve 30 rotates in three steps the distance equal to (width of land+width of cavity). Therefore, the angle of rotation θ in three steps is an angle obtained by dividing the angle of one rotation of the spool 32, that is 360° by the number of lands N. Thus, the following relation is held:

$$\theta = 360 \times \frac{1}{N} \text{ (degree)}$$

Since the angle of rotation per step of the spool 32 is equal, the angle of rotation $\theta_N$ per step of the spool 32 having N lands is:

$$\theta_N = 360 \times \frac{1}{N} \times \frac{1}{3} = \frac{120}{N} \text{ (degree)}$$

Next let us consider the condition in which the ports selected by the selector valve have the same opening degrees to the cavities of the respective cavity groups so that the control valve 30 is held stationary in a stabilized state.

Figure 19:
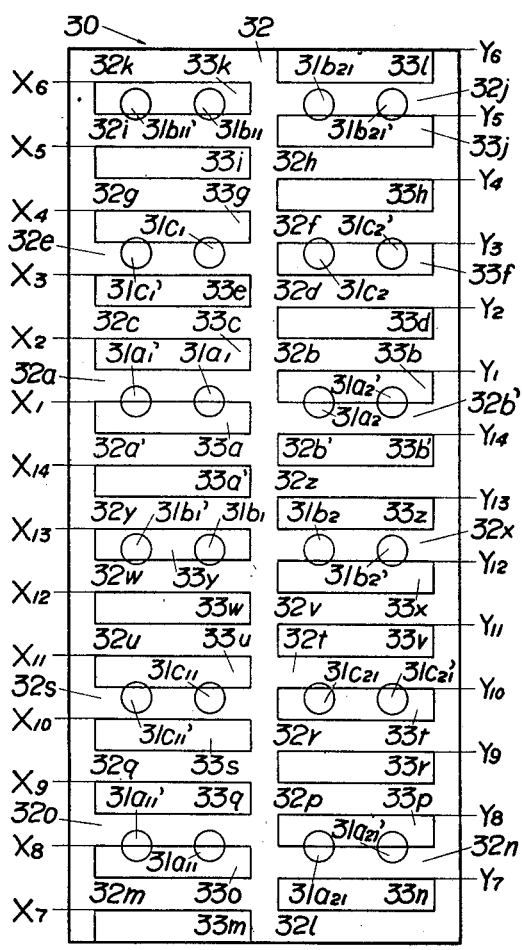
FIG. 19 is an explanatory, developed view of the control valve shown in FIGS. 13 to 17.

FIG. 19 shows a developed view of the prior control valve 30. In order that the spool 32 may be held stationary in a stabilized state when the ports 31a₁ and 31a₂ selected by the selector valve 40 has the same opening areas to the cavities 33a and 33b respectively, the area diagram showing the change in the opening areas to the cavities 33a and 33b of the ports 31a₁ and 31a₂ due to the rotation of the spool 32 from the reference point X₁ between the cavities 33a and 33b must be symmetrical with respect to the point X₁. Therefore, the points at which the above described condition is satisfied must be obtained from FIG. 19. These points may be divided into two groups: one being X₁, X₂ ... X₁₄ belonging to the point X₁ and the other being Y₁, Y₂ ... Y₁₄ interposed between the points X belonging to the first group.

Now let us consider first the point X₁ belonging to the first group. When the spool 32 is rotated even slightly in the clockwise direction, that is moved upwardly in FIG. 19, from the point X₁ where the opening areas of the ports 31a₁ and 31a₂ to the cavities 33a and 33b are equal, the opening area of the port 31a₁ to the cavity 33a is increased while the opening area of the port 31a₂ to the cavity 33b is decreased. Therefore, as described with reference to FIG. 18, the output shaft 53 of the driving device 50 is caused to rotate in the counterclockwise direction together with the spool 32 (to be moved downwardly in FIG. 19) so as to make equal the opening areas of the ports 31a₁ and 31a₂ to the cavities 33a and 33b respectively. On the other hand, when the spool 32 is rotated even slightly in the clockwise direction (moved downwardly in FIG. 19), the opening area of the port 31a₁ to the cavity 33a is reduced while the opening area of the port 31a₂ to the cavity 33b is increased. Therefore, the output shaft 53 of the driving device 50 is caused to rotate in the clockwise direction together with the spool 32 (moved upwardly in FIG. 19) so as to make equal the opening areas of the ports 31a₁ and 31a₂ to the cavities 33a and 33b respectively.

Now let it be assumed that at the point Y₁ belonging to the second group, the opening areas of the ports 31a₁ and 31a₂ to the cavities 33c and 33b are equal. In this case, the relative positions of the cavities 33c and 33b relative to the ports 31a₁ and 31a₂ are reversed with reference to those in case of the point X₁. Now when the spool 32 is rotated even slightly in the clockwise or counterclockwise direction, the spool 32 is caused to continue rotating in the direction of the initial rotation.

The above description is applied similarly in case of the points X₂ to X₁₄ and the points Y₂ to Y₁₄. Thus, the points X₁ to X₁₄ belonging to the first group are the stabilized points where the spool may be held stationary.

In the prior control valve 30, the angle of rotation per step $\theta_N$ of the spool having N lands is:

$$\theta_N = \frac{120}{N} \text{ (degree)}$$

Therefore, it is convenient to express all the quantities such as the widths of land, cavity and port, etc., in number of steps. First the quantities of the control valve 30 shown in FIG. 19 are expressed in terms of number of steps. As described above, the spool 32 is advanced in three steps the distance equivalent to (width of land+width of cavity) and the widths of land, cavity and ports are all equal, so that Three steps=2×(width of land)

Hence,

Width of land=width of cavity=width of port=1.5 step. Since the phase difference between two cavity groups is the width of cavity, Phase difference=1.5 step Next the construction in which the prior control valve 30 is incorporated in a step motor will be described with reference to FIG. 19. When the prior control valve 30 is incorporated in the step motor, the ports 31a₁ and $31a_2$; $31b_1$ and $31b_2$ and $31c_1$ and $31c_2$, the outer ports $31a_1'$, $31b_1'$ and $31c_1'$ and the outer ports $31a_2'$, $31b_2'$ and $31c_2'$ are communicated with each other respectively, as described above. In this case, the outer ports $31a_1$; $31b_1'$ and $31c_1'$ and the outer ports $31a_2'$, $31b_2'$ and $31c_2'$ which are arranged and disposed on the same circumference respectively can be communicated with each other respectively in a simple manner by providing annular grooves in the circumferential direction in the outer peripheral surface of the sleeve 31. On the other hand, the communications of the ports $31a_1$ with the port $31a_2$; of the port $31b_1$ with the port $31b_2$ and the port $31c_1$ with the port $31c_2$ which are all arranged in the axial direction of the sleeve 31 must be made by the axial grooves provided on the outer peripheral surface of the sleeve 31, and the fabrication of such axial grooves is very difficult and complex. In the control valve of the type described, these ports $31a_1$, $31b_1$ and $31c_1$; $31a_2$, $31b_2$ and $31c_2$, and the outer ports $31a_1'$, $31b_1'$ and $31c_1'$; and $31a_2'$, $31b_2'$ and $31c_2'$ are not positioned symmetrically in the sleeve 31. Therefore, when the pressure of the hydraulic pressure source 70 is raised so as to obtain a high driving power, an unbalanced pressure distribution in the sleeve necessarily occurs so that the rotation of the sleeve cannot be effected smoothly. Therefore, in practice as shown by the dotted lines in FIGS. 13 to 17 and the solid line in FIG. 19, pressure equalizing ports $31a_{11}$, $31b_{11}$, $31c_{11}$, $31a_{21}$, $31b_{21}$, and $31c_{21}$ and outer pressure equalizing ports $31a_{11}'$, $31b_{11}'$, $31c_{11}'$, $31a_{21}'$, $31b_{21}'$ and $31c_{21}'$ are provided circumferentially with the phase difference being 180° with respect to the ports $31a_1$ to $31c_2$ and the outer ports $31a_1'$ to $31c_2'$. In many cases, it is necessary to establish communications among the ports $31a_1$, $31a_2$, $31a_{11}$ and $31a_{21}$; $31b_1$, $31b_2$, $31b_{11}$ and $31b_{21}$; $31c_1$, $31c_2$, $31c_{11}$, and $31c_{21}$; the outer ports $31a_1'$, $31b_1'$, $31a_{11}'$ and $31b_{11}'$; and $31a_2'$, $31b_2'$, $31c_2$, $31a_{21}'$, $31b_{21}'$ and $31c_{21}'$. The outer ports $31a_1'$, $31b_1'$, $31c_1'$, $31a_{11}'$, $31b_{11}'$, $31c_{11}'$, $31a_2'$, $31b_2'$, $31a_{21}'$, $31b_{21}'$ and $31c_{21}'$ may be positioned along the same circumferences on the sleeve 31 so that annular grooves are provided in the outer surface of the sleeve 31 for communicating these ports. On the other hand, as shown in FIG. 19 the ports $31a_1$ and $31a_2$; $31a_{11}$ and $31a_{21}$; $31c_1$ $31c_2$; and $31c_{11}$ and $31c_{21}$ are positioned in the axial direction of the sleeve 31, while the ports $31a_1$ and $31a_{11}$; ports $31a_2$ and $31a_{21}$; $31b_1$ and $31b_{11}$; $31b_2$ and $31b_{21}$; $31c_1$ and $31c_{11}$; $31c_2$ and $31c_{21}$ are positioned circumferentially of the sleeve 31. Therefore, it is impossible to establish the required communications among the ports by the provisions of the axial and circumferencial grooves. The actual construction will be very much complicated and it will be impossible to establish the required communications among the ports in a limited space.

Now reference is made again to FIG. 19. When the ports $31a_1$, $31a_2$, $31a_{11}$ and $31a_{21}$ communicate with the tank 42 and are in the stabilized state where these ports have the same opening areas to the cavities $33a$, $33b$, $33c$ and $33p$ respectively, other ports $31b_1$, $31b_2$, $31b_{11}$, and $31b_{21}$, $31c_1$, $31c_2$, $31c_{11}$, $31c_{21}$ are positioned to oppose the cavities $33y$, $33x$, $33k$ and $33j$; and $33g$, $33f$, $33u$ and $33t$ respectively with predetermined opening areas respectively. Therefore, the cavities $33c$, $33e$, $33i$, $33m$, $33q$, $33s$, $33w$ and $33a'$ in the left cavity group in the figure and the cavities $33d$, $33h$, $33l$, $33n$ $33r$, $33v$, $33z$ and $33b'$ are not opened to the ports.

Therefore, it will be readily understood that one of the cavity groups may be eliminated in such a manner that the cavities in the cavity group eliminated are transferred to the other cavity group in the same states of opening as they are in the original cavity group, whereby the same effect as in the case of two cavity groups may be attained.

Figure 20:
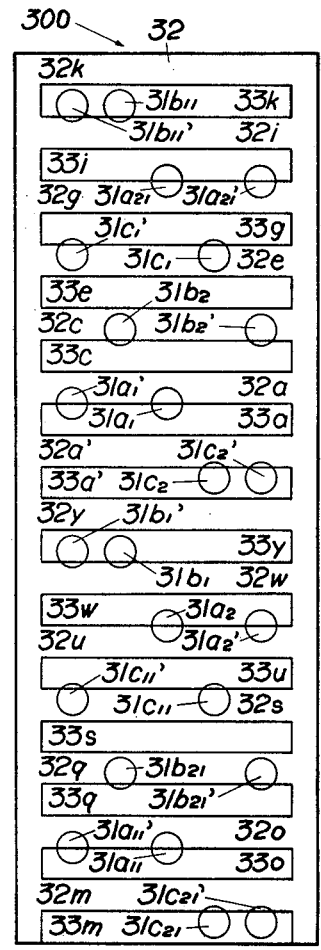
FIG. 20 is an explanatory, developed view of the control valve shown in FIGS. 1 to 6.
Figure 23:
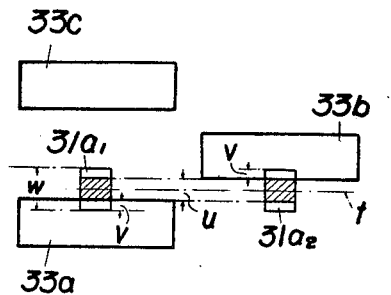
FIG. 23 is an explanatory view for obtaining the stabilized point opening degrees of the control valves.
Figure 24:
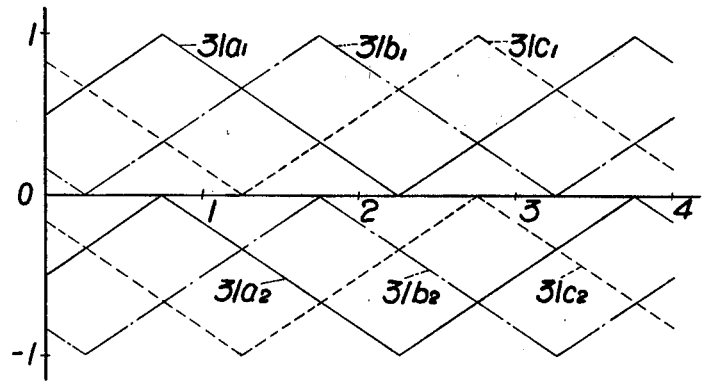
FIGS. 24 to 26 are graphs showing the variation in the port opening area corresponding to various numbers of steps when the width of the port is varied in the control valve of the present invention whose stabilized point opening degree is set to ½.
Figure 25:
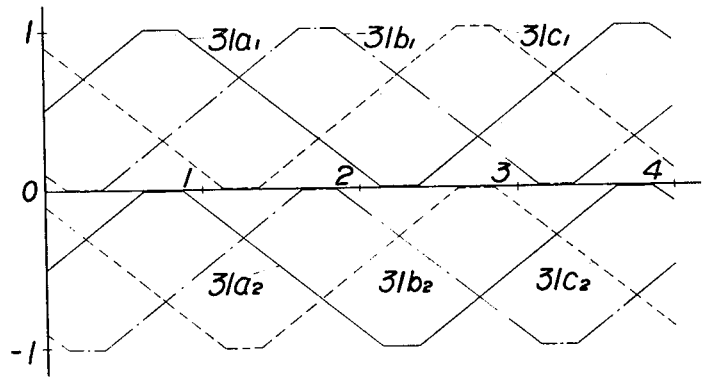
Figure 26:
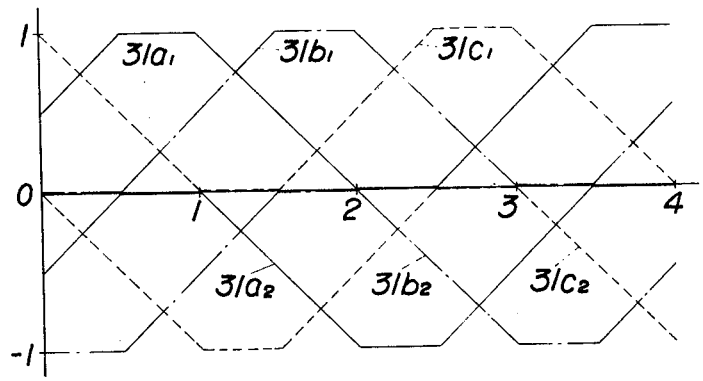
Figure 27:
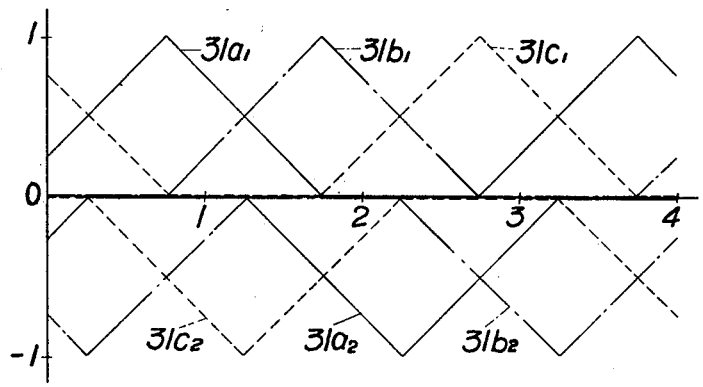
FIGS. 27 to 29 are graphs showing the variation in the port opening area corresponding to various numbers of steps when the combination of the widths of land, cavity and port are varied in the control valve of the present invention whose stabilized point opening degree is set to ¼.
Figure 28:
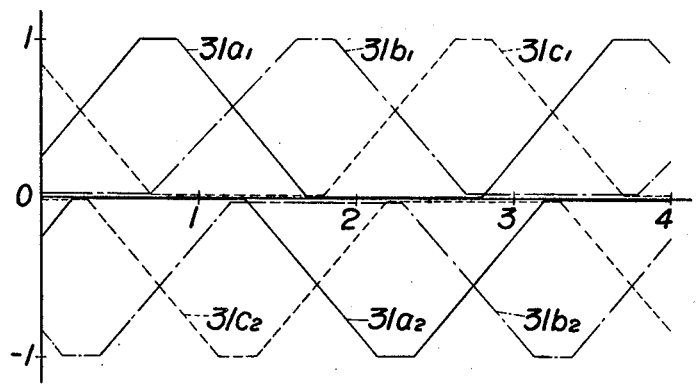
Figure 29:
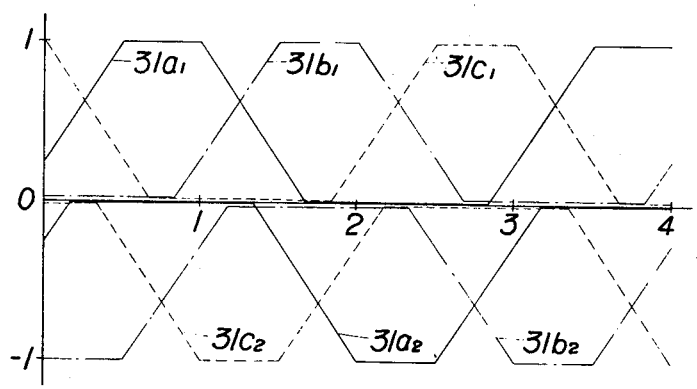
Figure 30:
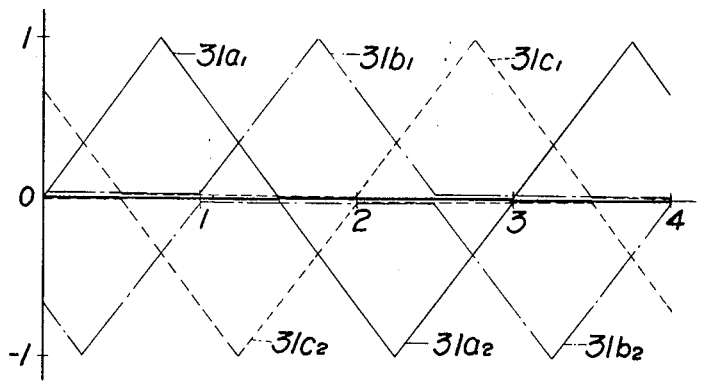
FIGS. 30 to 32 are graphs showing the variation of the port opening area corresponding to various numbers of steps when the combination of the widths of land, cavity and port are varied in the control valve of the present invention whose stabilized point opening degree is set to 0.
Figure 31:
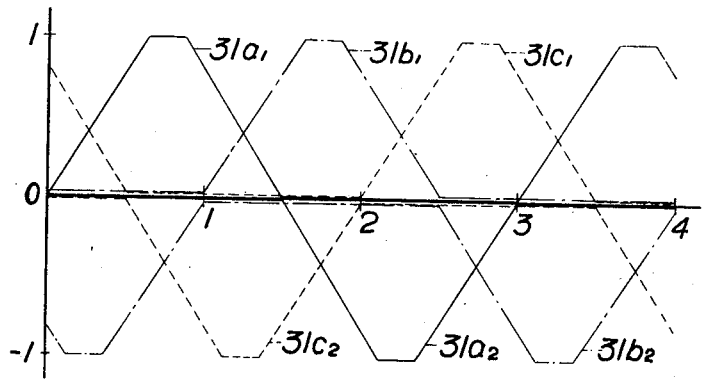
Figure 32:
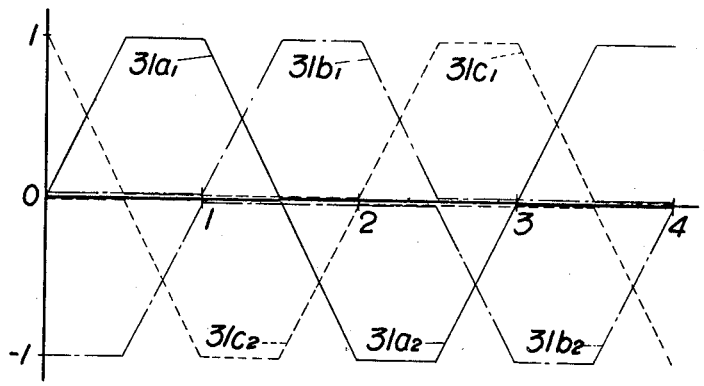

In view of the above, the cavities in the right side group, $33b$, $33d$, $33f$, ... are eliminated and the corresponding ports $31a_2$, $31a_2'$, $31a_{21}$, $31a_{21}'$, $31b_2$, $31b_2'$, $31b_{21}$, $31b_{21}'$, $31c_2$, $31c_2'$, $31c_{21}$ and $31c_{21}'$ are transfered to the cavities $33w$, $33i$, $33c$, $33g$, $33a'$ and $33m$ which are not opened to the ports of the left group. Thereafter, the ports $31a_1$, $31a_2$, $31a_{11}$ and $31a_{21}$; the ports $31b_1$, $31b_2$, $31b_{11}$, $31b'_{21}$; the ports $31c_1'$, $31c_2$, $31c_{11}$ and $31c_{21}$; the other ports $31a'$, $31b_1'$, $31c_1'$, $31a_{11}'$, $31b_{11}'$, $31c_{11}'$ and the outer ports $31a_2'$, $31b_2'$, $31c_2'$, $31a_{21}'$, $31b_{21}'$, $31c_{21}'$ are arranged and disposed cimcumferentially of the sleeve 31 as shown in FIG. 20. It will be understood that the effects of the arrangements of the ports shown in FIGS. 19 and 20 are the same since the ports belonging to the right group of cavities shown in FIG. 19 are moved to the cavities which are not opened to the ports in the left cavity group. When the ports belonging to the right cavity group are transferred to the cavities of the left group which are not opened to the ports belonging to the left cavity group, care should be taken so as to position the ports transferred from the right cavity group spaced apart from the original ports of the left cavity group by a distance longer than the width of the cavity. If the ports are not positioned as described above, the two ports adjacent to each other in the circumferential direction are both open to the cavity and communicate with each other. When thus arranged, the ports $31a_1$ and $31a_{21}$, the ports from $31b_1$ to $31b_{21}$, the ports $31c_1$ to $31c_{21}$, the outer ports $31a_1'$ to $31c_{11}'$ and the outer ports $31a_2'$ to $31c_{21}'$ are positioned along the same circumferences on the sleeve 31. Therefore, the communications among the ports can be established by just providing annular grooves in the outer periphery of the sleeve 31, whereby the control valve can be made simple in construction and compact in size.

The present invention is based upon the idea just described hereinbefore and one embodiment of a control valve 300 is illustrated in FIGS. 1 to 6.

A cylindrical sleeve 31 has the port groups consisting of the ports positioned along the same circumference on the outer periphery of the sleeve; the port group consisting of $31a_1$, $31a_2$, $31a_{11}$ and $31a_{21}$; the port group consisting of $31b_1$, $31b_2$, $31b_{11}$ and $31b_{21}$ the port group consisting of ports $31c_1$, $31c_2$, $31c_{11}$ and $31c_{21}$; the outer port group consisting of ports $31a_1'$, $31b_1'$, $31c_1'$, $31a_{11}'$, $31b_{11}'$, and $31c_{11}'$ and the outer port group consisting of $31a_2'$, $31b_2'$, $31c_2'$, $31a_{21}'$, $31b_{21}'$, and $31c_{21}'$. A spool 32 provided with one group of cavities $33a$, $33c$, $33e$, ... $33y$ and $33a$ having the same width and the lands $32a$, $32c$, $32e$, ... $32y$ and $32a'$ having the same width and being interposed between two adjacent cavities is fitted rotatably in the sleeve 31. Annular grooves $34a$, $34b$, $34c$, 34, and 36 are provided in the outer peripheral surface of the sleeve 31 so that the ports belonging to the same groups may be communicated with each other. A cover 37 is fitted over the sleeve 31 so as to cover the annular grooves $34a$, $34b$, $34c$, 35 and 36, respectively. It is provided with apertures $35'$ and $36'$ which respectively communicate with the grooves 35 and 36, and with apertures $34a'$, $34b'$ and $34c'$ which respectively communicate with the grooves $34a$, $34b$ and $34c$. The ports in the sleeve 31 are positioned respectively as follows. First, the ports $31a_1$, $32b_1$ and $31c_1$ and the ports $31a_2$, $31b_2$ and $31c_2$ are considered to belong to different groups. When the ports each one from two port groups which communicated with each other through the annular groove, for example the ports $31a_1$ and $31a_2$ have the same opening areas to the cavities of the spool 32 with the opening sides thereof being opposite as shown in FIGS. 1 to 6, other ports $31b_1$ and $31c_1$ are positioned in the clockwise and counterclockwise directions respectively from the port $31a_1$ and ahead thereof by the distance equivalent to $[n\times(\text{width of land}+\text{width of cavity})+\frac{1}{3}(\text{width of land}+\text{width of cavity})]$ or $[n\times(\text{width of land}+\text{width of cavity})+\frac{2}{3}(\text{width of land}+\text{width of cavity})]$ (in the embodiment shown in FIGS. 1 to 6, $n$ equals to 2). In the similar manner, other ports $31b_2$ and $31c_2$ are positioned in the clockwise and counterclockwise direction respectively of the port $31a_2$ and ahead of the same distance as is the case of the ports $31b_1$ and $31c_1$. That is, two ports are positioned circumferentially ahead of the reference port by the distance equivalent of [$n \times$ (width of land+width of cavity)±⅓ × (width of land+width of cavity)] in the clockwise and counterclockwise directions from the reference port. In other words, two ports are positioned spaced apart circumferentially from a stabilized point by the distance equal to ⅓ or ⅔ of (width of land+width of cavity) in both directions from the stabilized point. The outer ports $31a_1'$ to $31c_2'$ and the opposing ports $31a_{11}$ to $31c_{21}$ and $31a_{11}'$ to $31c_{21}'$ are positioned with the phase difference of 180° axially and circumferentially of the reference ports $31a_1$ to $31c_2$ respectively.

So far the present invention has been described in the case of the control valve 300 in which the width of land=width of cavity=width of port=phase difference=1.5 step. The ratio among the phase difference, the widths of port, land and cavity have close relations with the opening area of a port selected by a selector valve when the control valve is held stationary in a stabilized state. The opening area also determines the quantity of leakage of the working liquid when the control valve is in a stabilized state. Therefore, the opening area must be selected with due considerations to various conditions. Therefore, the selection of opening area will be described in detail hereinafter. The first method of adjusting the opening area of a port is to vary the phase difference or deviation. In this case, the phase difference is referred to as a deviation in the circumferential direction of one cavity group with respect to the other in a prior control valve having two cavity groups. In case of a control valve of the present invention having only one cavity group, it is necessary to re-arrange the cavity group into two groups as in the case of the prior control valve having two groups of cavities. FIG. 20 illustrates the development of the control valve of the present invention having the phase difference of 1.5 step. What is meant by the phase difference of 1.5 step can be clearly understood when compared with the prior control valve shown in FIG. 19 having the same effect with that of the control valve shown in FIG. 20. Now let it be assumed that the ports be held in their position shown in FIG. 19 while the left cavity group consisting of cavities $33a$, $33c$, . . . be moved downwardly by 0.5 step and the right cavity group consisting of cavities $33b$, $33d$, $33f$, . . . upwardly by 0.5 step. Then, the prior control valve having the phase difference of 0.5 step may be obtained. When the right cavity group is eliminated in a same manner as described hereinbefore and the ports in the right cavity group are transferred to the cavities of the left group which are not opened to the ports belonging to the left group, a control valve of the present invention having the phase difference of 0.5 step may be obtained. When the control valves shown in FIGS. 20 and 22 are compared, it will be seen that the opening areas of the ports $31a_1$, $31a_2$, $31a_{11}$, and $31a_{21}$ selected by the selector valve in the stabilized state are much less in the control valve having the phase difference of 0.5 step shown in FIG. 22 than the control valve having the phase difference of 1.5 step as shown in FIG. 20. Therefore, the quantity of the leakage of the working liquid in the stabilized state can be reduced less in the control valve shown in FIG. 22 than that shown in FIG. 20. In view of the above, it may be considered to make the phase difference as less as possible in order to reduce the leakage. But when the phase difference is made zero, the opening areas to the cavities of the ports $31_1$ and $31a_{11}$; the ports $31a_2$ and $31a_{21}$; the ports $31b_1$ and $31b_{11}$; and the ports $31b_2$ and $31b_{21}$ and the opening areas of the ports $31c_1$ and $31c_{11}$; and the ports $31c_2$ and $31c_{21}$ are all made equal, regardless the relative position of the sleeve 31 relative to the spool 32 so that the pilot pressure (the pressure difference between the piping 64 and 65 in FIG. 18) becomes zero.

When the phase difference is increased gradually, so is increased the pilot pressure. When the phase difference is set to 1.5 step, the phase relations between the ports $31a_1$ and $31a_{11}$; $31a_2$ and $31a_{21}$; $31b_1$ and $31b_{11}$; $31b_2$ and $31b_{21}$; $31c_1$ and $31c_{11}$ and $31c_2$ and $31c_{21}$ are reversed with respect to each other and the maximum pilot pressure can be attained.

It is understood that the selection of the phase difference must be made with due considerations to the permissible leakage and the magnitude of the pilot pressure as described above. The second method is to change the width or the diameter of the port. It will be understood that the opening area to the cavity of the port selected by the selector valve may be given by the product of the degree of opening of the port to the cavity (referred to as "stabilized point opening degree" hereinafter) by the maximum opening area of the port. When the widths of land and cavity are equal and the phase difference is 1.5 step, the stabilized point opening degree is always ½. However, as is understood from FIG. 22, when the phase difference is made lesser, the stabilized point opening degree is also made lesser. When the ratio of the width of land to the width of cavity is varied, the stabilized point opening degree is changed accordingly as described in detail hereinafter. Now let it be assumed that the width or the diameter of port is varied while the stabilized point opening degree is maintained at ½. In this case, the stabilized point opening degree is held constant while the maximum opening area of the port is varied depending upon the increase or decrease of the width or the diameter of the port. Therefore, it will be readily understood that the opening area of the port in the stabilized state given by the product of the stabilized point opening degree by the maximum opening area is varied accordingly. On the other hand, in case of a control valve whose stabilized point opening degree is less than ½ (for example a control valve shown in FIG. 22), the lesser the width or the diameter of the port, the lesser the maximum opening area and the stabilized point opening degree of the port in the stabilized state become. Therefore, the lesser the width or the diameter of the port, the lesser the opening area of the port in the stabilized state becomes so that the leakage of the working liquid can be reduced accordingly. However, the maximum opening area of each port in the operation of the control valve is reduced, so that the response of the rotary type hydraulic driving device 50 is lowered.

Therefore, in selecting the width or the diameter of the port, the permissible leakage in the stabilized state and the response characteristics of the rotary type hydraulic driving device 50 must be taken into consideration.

The third method of adjusting the opening area of the port in the stabilized state is to vary the ratio of the width or diameter of the port to the width of the land. As described in the method of varying the phase difference, a control valve of the present invention having only one cavity group must be rearranged and analyzed in the term of the prior control valve having two cavity groups in order to investigate the stabilized point opening degree. In order that the ports $31a_1$ and $31a_2$ (which are considered to be square ports for the sake of explanation) may have the same opening areas and be held in the stabilized state, the center line $t$ connecting the centers of both ports $31a_1$ and $31a_2$ must be located intermediate the upper edge of the cavity $33a$ and the lower edge of the cavity $33b$.

Now let it be assumed that the phase difference between the cavity groups to which belong the cavities $33a$ and $33b$ be 1.5 step. Then the space between the cavities $33a$ and $33b$ and the space between $33b$ and $33c$ are equal so that the longitudinal length $u$ of the shaded portion of the ports $31a_1$ and $31a_2$ is one-half of (width of land —width of cavity).

Since the longitudinal lengths above and below the shaded portions of the ports $31a_1$ and $31a_2$ must be equal, the longitudinal length $v$ of the portions of the ports $31a_1$ and $31a_2$ opening to the cavities $33a$ and $33b$:

$$v = \left( \text{width of port} - \frac{(\text{width of land} - \text{width of cavity})}{2} \right) \times 1/2$$

When the longitudinal length of the port $31a_1$ or $31a_2$ be $w$, the stabilized point opening degree is obtained by the relation of $v/w$, that is Stabilized point opening degree $$= \frac{\text{Width of port} - \frac{\text{width of land} - \text{width of cavity}}{2}}{2 \times \text{width of port}} \quad (A)$$

Since the prior control valve having two groups of cavities and the control valve of the present invention having only one cavity group have the same functional effect, the stabilized point opening degree of a control valve of the present invention can be obtained from the Equation A.

Now let us obtain the relationships among the widths of land, cavity and port when the stabilized point opening degrees are ½, ¼ and zero respectively.

The relationship between the widths of land and cavity is such that the spool of the control valve is rotated the distance equivalent to (width of land+width of cavity) in three steps. Therefore, the sum of the widths of land and cavity must be selected so as to be equal to three steps.

Next the relationship between (width of land—the width of cavity) and the width or the diameter of the port will be described hereinafter. From Equation A, when the stabilized point opening degree is ½, $$1/2 = \frac{\text{width of port} - \frac{\text{width of land} - \text{width of cavity}}{2}}{2 \times (\text{width of port})}$$

$$= \frac{\text{width of port}}{2 \times (\text{width of port})} - \frac{\frac{(\text{width of land}) - (\text{width of cavity})}{2}}{2 \times (\text{width of port})}$$

$$= 1/2 - \frac{(\text{width of land}) - (\text{width of cavity})}{4 \times (\text{width of port})}$$

(B)

Hence, from Equation B, (width of land) — (width of cavity) = 0

Therefore, when the stabilized point opening degree is ½, the width of land must be equal to the width of cavity, regardless the width of port.

In the similar manner, when the stabilized point opening degree is ¼, $$¼ = ½ - \frac{(\text{width of land}) - (\text{width of cavity})}{4 \times (\text{width of port})}$$

... (C)

Hence, from Equation C, (width of port) = (width of land) — (width of cavity)

Therefore, the width of port and (width of land—width of cavity) must be equal. Furthermore, when the stabilized opening degree is zero, $$0 = ½ - \frac{(\text{width of land}) - (\text{width of cavity})}{4 \times (\text{width of port})}$$

... (D)

Hence, from Equation D,

2 × (width of port) = (width of land) — (width of cavity)

Therefore, the width of port must be equal to one half of (width of land—width of cavity).

A fixed relation exists between the width of port and the width of the cavity. It is not preferable that the resistance produced when the working liquid flows through the cavity is larger than the throttle resistance in the variable throttle or restriction formed by a cavity and a port, so that the width of port is preferably selected equal to or less than the width of cavity. When the opening area of a port determined by the difference between the widths of port and cavity is larger than 0.5 of the maximum opening area, the range in which the opening areas of two sets of ports selected by the selector valve to the cavities are not changed at all between stabilized points is produced. Thus, the control of the control valve becomes impossible in this range. Therefore, it will be understood that the difference between the widths of cavity and port must be less than or at least equal to 0.5 step. The above described conditions may be summarized as follows:

(i) (width of land+width of cavity) = 3 steps
(ii) width of port = width of cavity
(iii) (width of cavity—width of port) ≤ 0.5 step
(iv) When the stabilized point opening degree is ½, (width of land) — (width of cavity) = 0
(v) When the stabilized point opening degree is ¼, (width of port) = (width of land) — (width of cavity)
(vi) When the stabilized point opening degree is zero, (width of port) = ½ × (width of land—width of cavity)

The widths of port, land and cavity which satisfy the above described conditions when the stabilized point opening degrees are respectively ½, ¼ and 0 may be given in the following table,

UNIT: STEP

| | Width of land | Width of port | Width of port |
|---|---|---|---|
| Stabilized point opening degree: | | | |
| ½ | 1.5 | 1.5 | 1.4 |
| ½ | 1.5 | 1.5 | 1.25 |
| ½ | 1.5 | 1.5 | 1.0 |
| ¼ | 2.0 | 1.0 | 1.0 |
| ¼ | 23/12 | 13/12 | 10/12 |
| ¼ | 11/6 | 7/6 | 4/6 |
| 0 | 9/4 | 3/4 | 3/4 |
| 0 | 17/8 | 7/8 | 5/8 |
| 0 | 2.0 | 1.0 | 0.5 |

In table above, the greatest and smallest values of the widths of port, land and cavity in each stabilized point opening degree indicates the maximum and minimum limits. The area diagrams are obtained from the above table as shown in FIGS. 24 to 32. From these graphs, the maximum opening area, the minimum opening area of each port and the ratio of the port being closed or opened in one step can be clearly seen. It should be noted here that when the stabilized point opening degree is set to zero, the width of cavity may be made smaller as compared with that of land so that the width of cavity is made smaller while the depth is increased, thereby reducing the flow resistance of the working liquid, whereby the number of cavities provided in the sleeve 32 can be increased. Therefore, the circumferential length of the spool 32 may be utilized in an effective manner and the angle of rotation per step can be further reduced. This will be clearly understood from another embodiment of a control valve of the present invention illustrated in FIGS. 7 to 12, wherein the stabilized point opening degree is zero, the width of land is 9/4 step, the width of cavity is ¾ step and the width of port is ¾ step.

So far the present invention has been described in conjunction with the control valves in which the pressure equalizing ports $31a_{11}$ to $31c_{21}$ and the outer equalizing ports $31a_{11}'$ to $31c_{21}'$ are provided for the ports $31a_1$ to $31c_2$ and the outer ports $31a_1'$ to $31c_2'$. However, it is not necessary to provide these pressure equalizing ports when the working pressure of the hydraulic pressure source is relatively low so that the smooth, balanced rotation of the spool 32 is effected.

When no pressure equalizing ports are provided, the number of cavities of the spool 32 may be either an even or odd number. When the pressure equalizing ports are provided, the number of the cavities is preferably an even number.

The outer ports $31a_1'$, $31b_1'$ and $31c_1'$ (and $31a_{11}'$, $31b_{11}'$ and $31c_{11}'$) and the outerports $31a_2'$, $31b_2'$ and $31c_2'$ (and $31a_{21}'$, $31b_{21}'$ and $31c_{21}'$) are shown as being arranged in the axial direction of these sleeve 31 and having the same size with the ports from $31a_1$ to $31c_1$ ($31a_{11}$ to $31c_{11}$) and the ports from $31a_2$ to $31c_2$ ($31a_{21}$ to $31c_{21}$). However, the outer ports may be of any size or may be deviated in the circumferential direction relative to the corresponding ports as far as the outer ports communicate with the ports which have been communicated with the tank 42, through one of the cavities and this communication can be held at least until the spool is held stationary at the stabilized point.

Preferred embodiments of the present invention have been described hereinbefore, and there will be immediately obvious to those skilled in the art that various variations, alterations and/or modifications may be resorted to without departing from the spirit and scope of the present invention.

What is claimed is:

1. A control valve comprising an elongated sleeve member having a perpiheral wall; an elongated spool member received within said sleeve member and having an outer circumferential surface, at least one of said members being turnable with reference to the other; a plurality of elongated recesses provided in said outer surface extending longitudinally of said spool member and circumferentially spaced from one another by a predetermined distance, and a plurality of lands each interposed between two adjacent ones of said recesses; and port means provided in said peripheral wall communicating with the interior of said sleeve member, said port means including two longitudinally spaced first sets each comprising a plurality of circumferentially distributed ports and at least two longitudinally spaced second sets each having an additional plurality of circumferentially distributed ports which are respectively aligned with ports of one of said first sets in longitudinal direction of said spool member, said port means being constructed and arranged for selectively establishing communication between at least one port each of one of said first and second sets, and at least one port each of the other first and second sets via respective ones of said recesses in response to relative turning movement of said members with reference to one another.

2. A control valve as defined in claim 1, wherein said second sets are located intermediate said first sets.

3. A control valve as defined in claim 2; and further comprising at least one third set including a plurality of ports provided in said peripheral wall and similar to the ports of said first and second sets.

4. A control valve as defined in claim 1, said sleeve member having an external circumferential surface; further comprising a tubular cover member tightly surrounding said sleeve member in engagement with said external surface; a plurality of continuous circumferential grooves provided in said external surface and each communicating with all of the ports of one of said sets; and a plurality of apertures provided in said cover member and communicating with the respective grooves and with the exterior of said cover member.

5. A control valve according to claim 1, said sets of ports each consisting of three ports positioned in positions correlated with said recesses, whereby when one in each of said sets of ports has an identical cross-sectional opening area with one half of said ports being open to a recess in communication with said one half of said ports in the direction opposite to that of the other half of said ports in which said other half of said ports are open to another recess, one of the remaining two ports of each of sets of ports is positioned between the stabilized point formed by said recesses and another stabilized point circumferentially spaced in one direction from said first mentioned stabilized point while the other of said remaining two ports is positioned between said first mentioned stabilized point and a further stabilized point circumferentially spaced in the direction opposite to said one direction.

6. A control valve according to claim 5, said spool member being turnable within said sleeve member, and said remaining two ports of each of said sets of ports being positioned respectively in clockwise and counterclockwise directions relative to said one port and spaced apart from an arbitrary stabilized point on the side of said spool member by a distance equal to at most $2/3$ of the combined widths of a recess and a land adjacent the recess.

7. A control valve as defined in claim 6, wherein said distance is equal to at least substantially $1/3$ of said combined widths.

8. A control valve as defined in claim 1; and further comprising pressure-equalizing apertures provided in said sleeve member opposite said first and second sets, respectively, and being circumferentially offset by at least substantially 180° with reference to said first and second sets.

9. A control valve according to claim 1, said sets of ports each consisting of three ports and being arranged and disposed in said sleeve member in such a manner that when one half of the ports one from each of said sets of ports are closed one of said lands in the direction opposite to the direction in which the other half of said ports are closed by another one of said lands, the remaining two ports of each of said sets of ports are spaced apart from an arbitrary stabilized point on the side of said spool member by a distance equal to $1/3$ or $2/3$ of the combined width of a land and a recess in the clockwise and counterclockwise directions, respectively.

References Cited

UNITED STATES PATENTS

| | | | |
|---|---|---|---|
| 123,669 | 2/1872 | Blake | 137—625.48 |
| 1,546,579 | 7/1925 | Hammond | 137—625.23 X |
| 1,836,929 | 12/1931 | Metzgar | 137—625.47 X |
| 3,213,881 | 10/1965 | Findlay et al. | 137—625.24 X |

FOREIGN PATENTS 35,780  11/1929  France.

M. CARY NELSON, Primary Examiner

MICHAEL O. STURM, Assistant Examiner

U.S. Cl. X.R.

137—625.47